No. 681,777. Patented Sept. 3, 1901.
J. W. CARLISLE.
CORN HARVESTER.
(Application filed May 27, 1901.)
(No Model.)
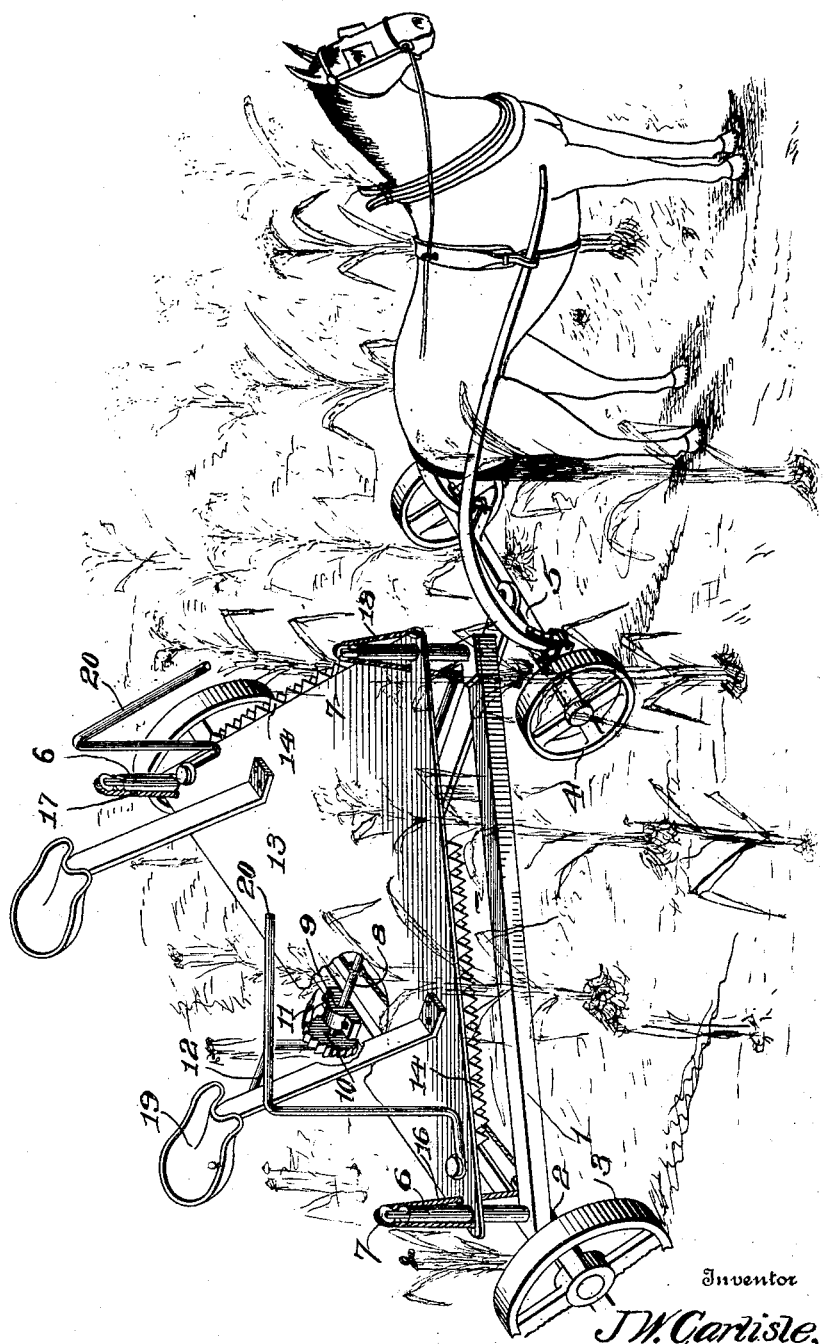

UNITED STATES PATENT OFFICE.

JAMES W. CARLISLE, OF ALGIERS, INDIANA.

CORN-HARVESTER.

SPECIFICATION forming part of Letters Patent No. 681,777, dated September 3, 1901.

Application filed May 27, 1901. Serial No. 62,082. (No model.)

*To all whom it may concern:*

Be it known that I, JAMES W. CARLISLE, a citizen of the United States, residing at Algiers, in the county of Pike and State of Indiana, have invented certain new and useful Improvements in Corn-Harvesters; and I do declare the following to be a full, clear, and exact description of the invention, such as will enable others skilled in the art to which it appertains to make and use the same.

The invention relates to corn-harvesters.

The object of the invention is to provide a machine of this character which shall be simple of construction, durable in use, comparatively inexpensive of production, and efficient in action, and by means of which two rows of corn may be simultaneously cut and by means of which the corn so cut is delivered upon the platform, where it is bound by hand in form of shocks and deposited in a standing position on the ground.

With this and other objects in view the invention consists of certain novel features of construction and combination and arrangement of parts, which will be hereinafter more fully described, and particularly pointed out in the appended claim.

In the accompanying drawing I have represented my invention in perspective.

In the drawing, 1 denotes the triangular main frame, preferably made of angle-iron or any other desirable material, 2 the rear axle secured thereto, 3 the rear supporting-wheels, and 4 the forward supporting-wheels, which wheels 4 are journaled on an axle 5, pivoted to the forward end of the draft-bars.

6 denotes posts rising vertically from the three corners of the triangular frame and having journaled in their upper ends grooved pulleys 7.

8 denotes a longitudinal shaft journaled in suitable bearings, the rear one of which is designated 9 and the forward one of which is located at the apex of the triangular frame. This shaft has at its rear end a ratchet-wheel 10, engaged by a pawl 11. This shaft is rotated by a crank or other suitable means 12.

13 denotes a triangular frame of substantially the same dimensions as the main frame and provided on its forwardly-disposed edges with cutting-knives 14. Ropes 16 and 17 are connected adjacent to the rear end of the shaft, pass up over the sheaves in the rear posts of the main frame, and are connected to the rear ends of the triangular frame 13, while a rope 18 is connected to the forward end of the shaft, passes up over the sheave in the post at the forward end of the main frame, and is secured to the forward end of the triangular frame. Each of these posts projects upwardly through apertures formed in the frame 13 and serves to guide the frame in its vertical movement and prevent it from rocking or shifting sidewise when it is adjusted. The frame 13 is suitably floored and is provided with seats 19 and along its edges with catcher-arms 20, which assist in collecting the cut cornstalks.

In operation the machine is adapted to be drawn between two rows of corn and simultaneously cut the two rows, which are deposited on a platform on the frame 13 and there made into a shock and afterward dumped upon the ground in a standing position. The cornstalks may be cut at different heights, as occasion may require, and it was with this object in view that I made the frame 13 vertically adjustable.

From the foregoing description, taken in connection with the accompanying drawing, the construction, mode of operation, and advantages of my invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

The combination with the wheel-supported triangular frame, provided with upwardly-projecting posts at its corners, sheaves journaled in said posts, and a longitudinal shaft, of a supplementary triangular frame having holes in its corners through which the posts project, and ropes having one of their ends engaged with the shaft and the other ends engaged with said sheaves and connected to the corners of the supplemental frame, and means for rotating said shaft to wind or unwind the rope, and cutters secured to the
5 sides of the supplemental frame, substantially as set forth.

In testimony whereof I have hereunto set my hand in presence of two subscribing witnesses.

JAMES W. CARLISLE.

Witnesses:
R. W. HARRIS,
R. E. CHAPPELL.